(12) United States Patent
Concepcion (10) Patent No.: US 7,903,643 B1
(45) Date of Patent: Mar. 8, 2011

(54) METHOD AND APPARATUS FOR DETERMINING BANDWIDTH FOR SERVICES OVER AN INTERNET PROTOCOL NETWORK

(75) Inventor: Cronder Concepcion, New York, NY (US)

(73) Assignee: AT&T Intellectual Property II, L.P., Reno, NV (US)

( * ) Notice: Subject to any disclaimer, the term of this patent is extended or adjusted under 35 U.S.C. 154(b) by 944 days.

(21) Appl. No.: 11/323,050

(22) Filed: Dec. 29, 2005

(51) Int. Cl.
*G01R 31/08* (2006.01)
*H04L 12/66* (2006.01)
*H04L 12/28* (2006.01)
*G06F 15/16* (2006.01)
*G06F 13/00* (2006.01)
*G06F 3/00* (2006.01)
*G06F 13/12* (2006.01)

(52) U.S. Cl. ............ 370/356; 370/253; 370/395.21; 709/233; 709/234; 710/33; 710/60; 710/68

(58) Field of Classification Search .......... 370/232–234, 370/252, 253, 395.2, 395.21, 356, 468; 709/231–234; 710/33–35, 60, 61, 68
See application file for complete search history.

(56) References Cited

U.S. PATENT DOCUMENTS

| | | | | |
|---|---|---|---|---|
| 5,875,314 A * | 2/1999 | Edholm | | 710/317 |
| 6,269,078 B1 * | 7/2001 | Lakshman et al. | | 370/230 |
| 6,356,545 B1 * | 3/2002 | Vargo et al. | | 370/355 |
| 6,397,230 B1 * | 5/2002 | Carmel et al. | | 715/210 |
| 6,483,835 B1 * | 11/2002 | Tanigawa et al. | | 370/395.21 |
| 6,539,027 B1 * | 3/2003 | Cambron | | 370/442 |
| 6,738,351 B1 * | 5/2004 | Qureshi et al. | | 370/235 |
| 7,020,247 B1 * | 3/2006 | Williams | | 379/15.03 |
| 2003/0002529 A1 * | 1/2003 | Gibbons et al. | | 370/468 |
| 2005/0021897 A1 * | 1/2005 | Kosaraju | | 710/316 |
| 2005/0220034 A1 * | 10/2005 | Zaniolo et al. | | 370/252 |

* cited by examiner

*Primary Examiner* — Daniel J Ryman
*Assistant Examiner* — Thinh D Tran (57) ABSTRACT

A method and apparatus for determining a bandwidth needed for services to be provided over an Internet Protocol (IP) network such as a Voice over Internet Protocol (VoIP) network and a Service over Internet Protocol (SoIP) network are disclosed. For example, the service provider utilizes a tool (e.g., an algorithm or a software application) that calculates the effective compression ratio and effective data rate of traffic on an IP network based on customer specified traffic information and standards for coding, protocol overhead, sampling, etc. In one embodiment, the network service provider presents a menu to a customer to allow the customer to enter the pertinent traffic information. Once the traffic information is received, the tool will determine the Effective Data Rate (EDR) and Effective Compression Ratio (ECR).

1 Claim, 8 Drawing Sheets

| | |
|---|---|
| VoIP, FoIP & MoIP NET EFFECTIVE DATA RATE [EDR] (Kbps): | 28.36 |
| NET EFFECTIVE COMPRESSION RATIO [ECR]: | 2.26 |
| VOICE OVER IP [VoIP] (Kbps): | 28.36 |
| T.38 FAX OVER IP [FoIP] (Kbps): | 0.00 |
| SUPER G3 FAX/MODEM OVER IP [MoIP] (Kbps): | 0.00 |

| Medium/Codec | Codec Data Rate | Average Per Call Bandwidth (Data Rate in Kbps) | | | | Per interface |
| --- | --- | --- | --- | --- | --- | --- |
| | | T1/T3/OC-3c | OC-12c or Greater | Ethernet | Ethernet VLAN | Parameters |
| VoIP/G.729A | 8 Kbps | 16.45 | 16.94 | 23.87 | 24.85 | 42% VAD; 20ms; no MPLS |
| VoIP/G.726 | 32 Kbps | 53.76 | 54.60 | 66.36 | 68.04 | 0% VAD; 20ms; no MPLS |
| VoIP/G.711 | 64 Kbps | 87.62 | 88.47 | 99.96 | 101.64 | 0% VAD; 20ms; no MPLS |
| FoIP-T.38/G3 Fax | 9600 BAUD (9.6 Kbps) | 18.75 | 19.15 | 24.80 | 25.60 | unbalanced traffic; no MPLS |
| FoIP-T.38/G3 Fax | 14400 BAUD (14.4 Kbps) | 23.58 | 23.99 | 29.60 | 30.40 | unbalanced traffic; no MPLS |

| Traffic Mix Examples | Balanced (bi-directional) Fax | Low-Rate Fax (e.g. 7200 BAUD) | Average Per Call Bandwidth (Data Rate in Kbps) Bandwidth (e.g. T3) | Parameters |
|---|---|---|---|---|
| 90% VoIP; 10% FoIP | Yes | No | 15.98 | G.729A; 42% VAD; 20ms; no MPLS |
| 90% VoIP; 10% FoIP | No | No | 17.16 | G.729A; 42% VAD; 20ms; no MPLS |
| 90% VoIP; 10% FoIP | Yes | Yes | 15.62 | G.729A; 42% VAD; 20ms; no MPLS |
| 90% VoIP; 10% FoIP | No | Yes | 16.44 | G.729A; 42% VAD; 20ms; no MPLS |
| 80% VoIP; 20% FoIP | Yes | No | 15.52 | G.729A; 42% VAD; 20ms; no MPLS |
| 80% VoIP; 20% FoIP | No | No | 17.88 | G.729A; 42% VAD; 20ms; no MPLS |
| 80% VoIP; 20% FoIP | Yes | Yes | 14.79 | G.729A; 42% VAD; 20ms; no MPLS |
| 80% VoIP; 20% FoIP | No | Yes | 16.42 | G.729A; 42% VAD; 20ms; no MPLS |

METHOD AND APPARATUS FOR DETERMINING BANDWIDTH FOR SERVICES OVER AN INTERNET PROTOCOL NETWORK

The present invention relates generally to communication networks and, more particularly, to a method for determining bandwidth needed for services on Internet Protocol (IP) networks such as Voice over Internet Protocol (VoIP) and Service over Internet Protocol (SoIP) networks.

BACKGROUND OF THE INVENTION

The Internet has emerged as a critical communication infrastructure, carrying traffic for a wide range of important applications. Internet services such as VoIP and SoIP services are becoming ubiquitous and more and more businesses and consumers are relying on the Internet for meeting their communications needs. For example, enterprises combine their voice and data services on an Internet based infrastructure. A customer moving services from a traditional telephone network based on Time Division Multiplexing (TDM) infrastructure to the Internet protocol based infrastructure needs to determine the amount of bandwidth required on the new infrastructure. One way to determine the total bandwidth required for the various services is simply using the data rate of coders and decoders for each of the services and adding the capacity used for each of the services. However, the IP infrastructure enables the customer to share the bandwidth among the various services and to reduce the size and cost of capacity and interface devices. Thus, the actual bandwidth consumption on the IP infrastructure for the combined traffic depends on various factors such as the protocol overhead, compression ratio, traffic mix, etc. Therefore, it is difficult to provide the actual bandwidth to a customer without performing extensive analysis and associated calculations.

Therefore, there is a need for a method that enables the service provider to provide to the customer the bandwidth of the combined traffic in the IP network.

SUMMARY OF THE INVENTION

In one embodiment, the present invention discloses a method and apparatus for determining a bandwidth for services to be provided over an IP network such as a Voice over Internet Protocol (VoIP) or a Service over Internet Protocol (SoIP) network. For example, the service provider utilizes a tool (e.g., an algorithm or a software application) that calculates the effective compression ratio and effective data rate of traffic on an IP network based on specified traffic information and standards for coding, protocol overhead, sampling, etc. In one embodiment, the network service provider presents a menu to a customer to allow the customer to enter the pertinent traffic information. Once the traffic information is received, the tool will determine the Effective Data Rate (EDR) and Effective Compression Ratio (ECR). The service provider then provides the EDR and ECR to the customer, i.e., providing the customer with bandwidth determination of services. In one embodiment, the service provider also determines the number of ports and/or interfaces needed to support the services.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for determining bandwidth for services provided over a packet network such as an IP network, e.g., a Voice over Internet Protocol (VoIP) network or a Service over Internet Protocol (SoIP) network. Although the present invention is discussed below in the context of VoIP and SoIP networks, the present invention is not so limited. Namely, the present invention can be applied for other networks such as a cellular network and the like.

Figure 1:
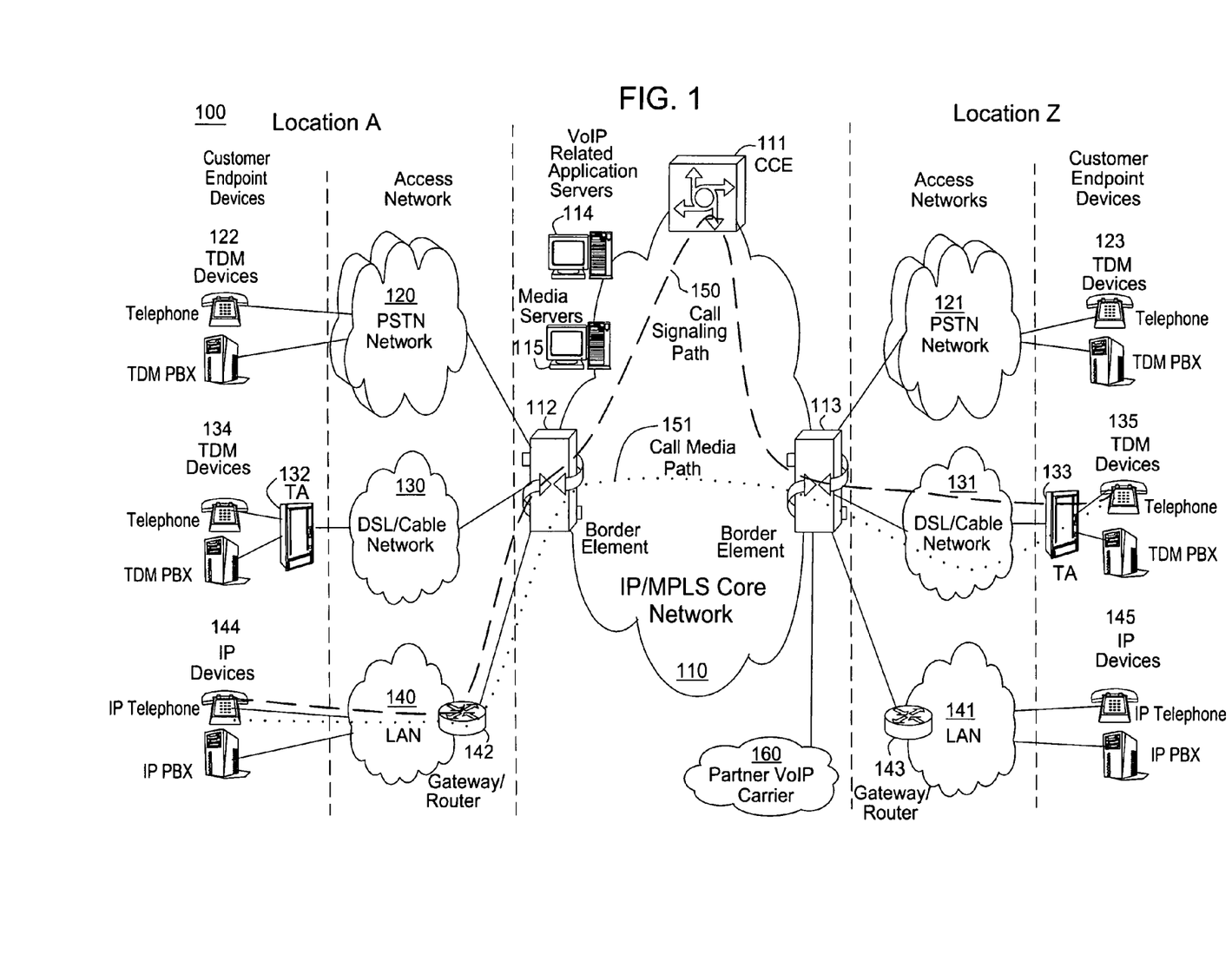
FIG. 1 illustrates an exemplary network related to the present invention.

To better understand the present invention, FIG. 1 illustrates an example network 100, e.g., a packet network such as a VoIP network related to the present invention. Exemplary packet networks include Internet protocol (IP) networks, Asynchronous Transfer Mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted as limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and/or router 142. A packet based access network 130 or 131, such as DSL or Cable, when used together with a TA 132 or 133, is used to support TDM based customer endpoint devices.

The core VoIP infrastructure comprises of several key VoIP components, such as the Border Elements (BEs) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that requires certain service specific features, e.g. translation of an E.164 voice network address into an IP address and so on.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

Media Servers (MS) 115 are special servers that typically handle and terminate media streams, and to provide services such as announcements, bridges, transcoding, and Interactive Voice Response (IVR) messages for VoIP service applications. The media servers also interact with customers for media session management to accomplish tasks such as process requests.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

The above network is described to provide an illustrative environment in which packets are transported and services are provided on networks such as VoIP and SoIP networks. Internet services such as VoIP and SoIP services are becoming ubiquitous and more and more businesses and consumers are relying on the Internet for meeting their communications needs. For example, enterprises combine their voice, fax, modem and other data services on an Internet based infrastructure. A customer moving services from a traditional telephone network established on Time Division Multiplexing (TDM) infrastructure to the Internet protocol based infrastructure needs to determine the amount of bandwidth required on the Internet protocol based infrastructure. One way to determine the total bandwidth required for the various services is using the data rate of coders/decoders for each of the services and adding up the capacity used for each of the services. However, the IP infrastructure enables the customer to share the bandwidth among the various services and to reduce the size and cost of capacity and interface devices.

For example, a customer may have fax services with minimal usage. The fax service may be utilized only for receiving or only for transmitting. In another example, a customer may have a voice service and may have significant silent intervals. Voice Activity Detection (VAD) technology may be included to suppress the silence intervals and reduce overall bandwidth requirement. Also, the various Layer 2 and Layer 3 protocols have various overheads. Thus, the required bandwidth for each customer depends on usage of the protocols. The actual bandwidth consumption on the IP infrastructure for the combined traffic of a customer with multiple services depends on various factors such as the protocol overhead, compression ratio, traffic mix, etc. Thus, the customer needs to determine the required bandwidth for services based on his/her own traffic mix.

In one embodiment, the current invention discloses a method and apparatus for determining bandwidth for services provided on IP networks. In order to clearly illustrate the teachings of the current invention, the following terminologies and networking concepts will first be described:

Effective Data Rate (EDR); and
Effective Compression Ratio (ECR).

Effective Data Rate (EDR) refers to bandwidth consumption in Kilobits per second. In one example, the voice data can be encoded using various coding standards, e.g., the ITU standards G.711 (64 Kbps), G.726 (32 Kbps), G.728 (16 Kbps), etc. The 64 Kbps VoIP is defined in G.711 ITU standard and the 32 Kbps VoIP is defined in G.726 ITU standard. In another example, the Modem over IP (MoIP) traffic is between 9.6 Kbps and 56 Kbps. If the VoIP network of FIG. 1 is used for the Voice Band Data (VBD), it can be encoded and transmitted as a 64 Kbps or 32 Kbps VoIP using either G.711 or G.726 standards. Demodulated Group 3 (G3) fax data is transmitted using the T.38 standard real-time Fax over IP (FoIP) protocol. The super G3 fax data rate is 33.6 Kbps. The super G3 fax data can be transmitted using either encoded speech defined in G.711 ITU standard or using demodulated MoIP. If the fax traffic is primarily unidirectional, the Fax over IP (FoIP) traffic load is further reduced at least in one direction. The Effective Data Rate (EDR) is determined by taking into account the protocol standards, overhead requirements, mix of traffic, etc.

Effective Compression Ratio (ECR) refers to a number calculated based on the traffic information that signifies the compression level relative to circuit switching. The traffic information that affects the ECR may include the following:

Traffic mix, e.g., percentages for speech, fax, Voice Band Data (VBD), etc.;
Speech coder/decoder used;
Sampling interval length (e.g., in milliseconds);
Number of samples per packet;
Layers 2 and 3 protocols used by the traffic;
Use of Voice Activity Detection (VAD) technology for silence suppression;

VoIP overhead compression, e.g. Compressed Transport Control Protocol (CRTP);

One-way or two-way fax transmission; and

Usage of lower fax rate (rates less than the 14.4 Kbps).

Figure 2:
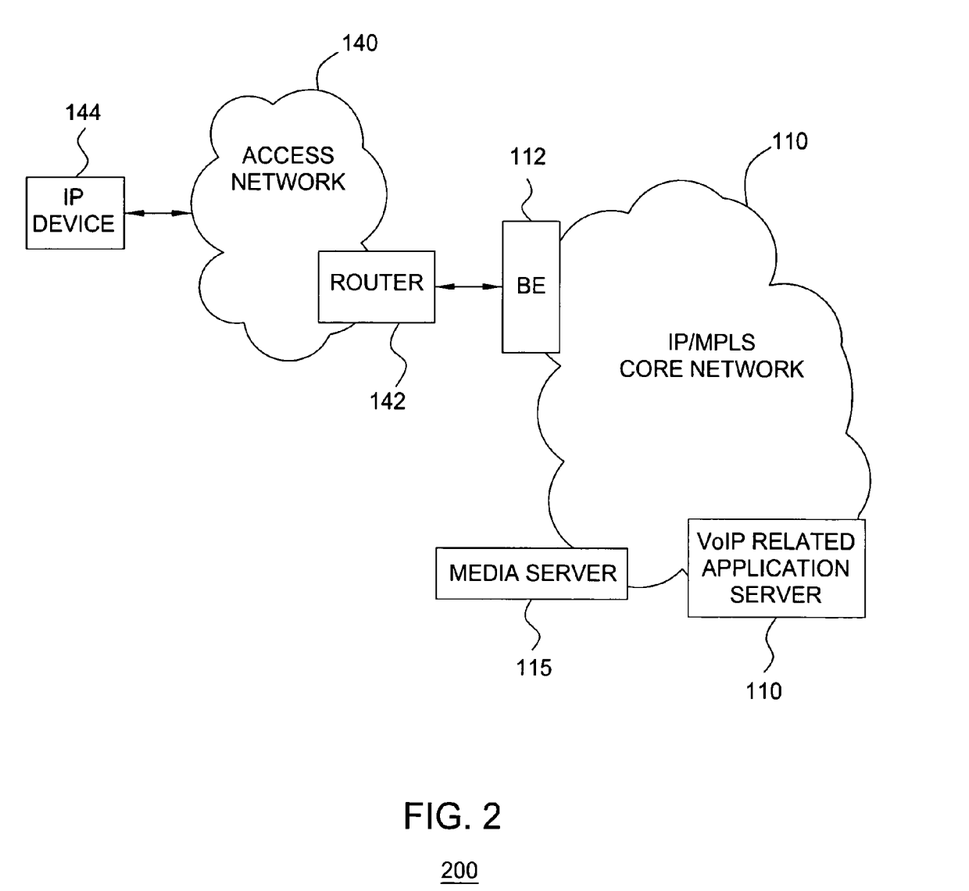
FIG. 2 illustrates an exemplary network with one embodiment of the invention for providing the bandwidth required for services.

FIG. 2 illustrates an exemplary network 200 with one embodiment of the present invention for providing the bandwidth required for services. For example, the enterprise customer is using an IP device 144 to access IP services such as VoIP, FoIP, MoIP and/or SoIP services. IP device 144 is connected to the access network 140 (e.g., a LAN). The access network 140 contains gateway router 142. The gateway router is connected to a core network, e.g., an IP/MPLS core network 110 via border element 112. The VoIP application server 114 is in the IP/MPLS core network. In one embodiment, the service provider may utilize application server 114 to implement the present invention for determining the bandwidth required for services and to provide the information to the customer. The VoIP application server 114 may utilize the media server 115 for interacting with the customer to obtain information from the customer as well as to present menus to the customer for inputting data needed for calculating the bandwidth. Note that only the network elements used to describe the present invention are illustrated in FIG. 2. It is not intended to show all network elements used to deliver VoIP, SoIP, FoIP and other IP services.

In one embodiment, the present invention discloses a method and apparatus for determining bandwidth for services provided over an IP network. For example, the service provider creates a tool (e.g., an algorithm) that calculates the effective compression ratio and effective data rate of traffic on IP networks. The tool is built based on knowledge of standards for coding, protocol overhead, sampling, etc. and allows for input of traffic information. The traffic information may include mixture of traffic (voice, fax, modem, etc.), layer 2 and layer 3 protocols, coder/decoder types, data rate, number of samples per packet, length of sample packet, two-way versus one-way transmission of packets, various types of packets, usage of bandwidth optimization techniques, etc. The service provider then enables a customer to request for a bandwidth determination of the services, based on network services being provided on the IP network.

Figure 3:
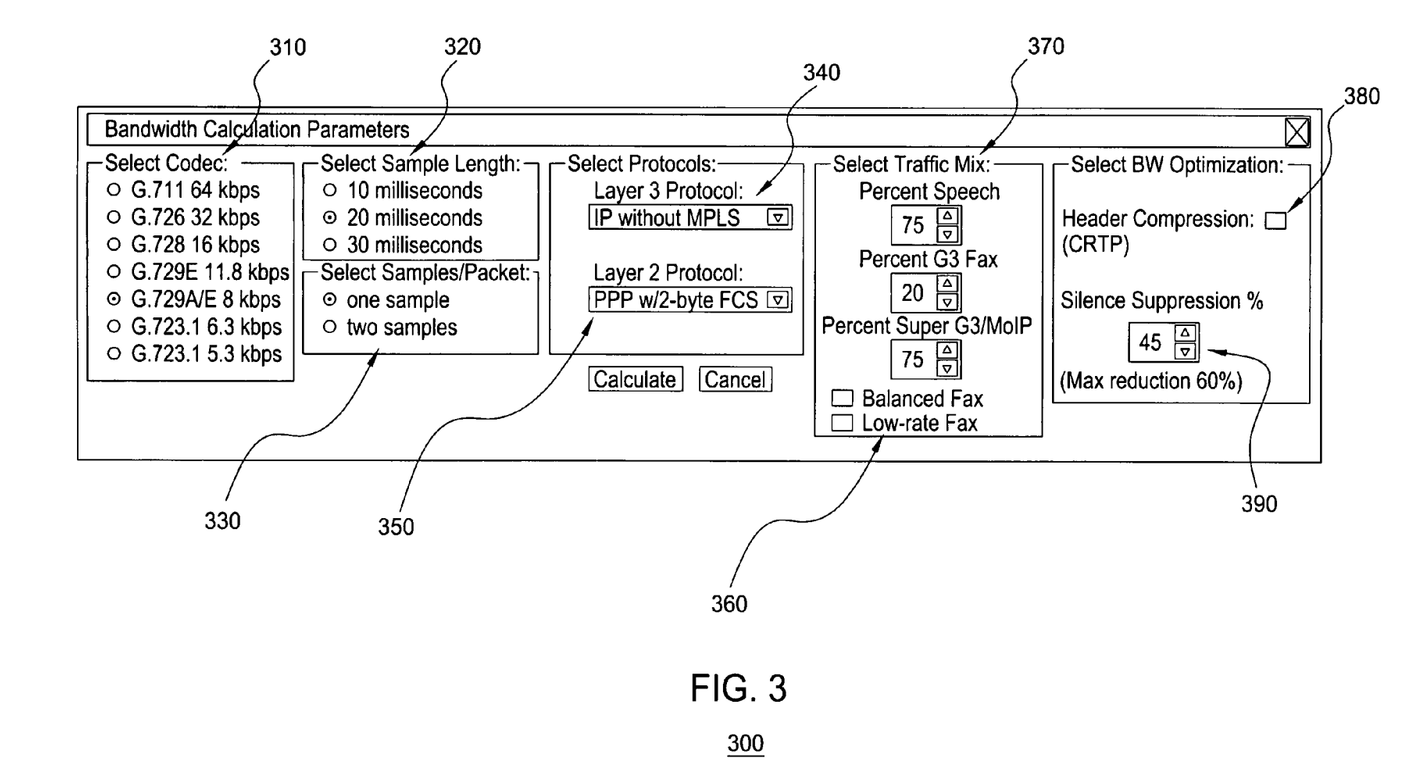
FIG. 3 illustrates a display or a graphical user interface for allowing a customer to enter traffic information.

FIG. 3 illustrates a display or a graphical user interface 300 for allowing a customer to enter traffic information. For example, the information may be obtained via a user input form such as a menu presented to the customer by the service provider. In one embodiment, the menu includes the parameters for inputting the coder/decoder 310, sample length 320, number of samples per packet 330, Layer 3 protocol used 340, Layer 2 protocol used 350, fax designation (e.g., balanced and low rate) 360, traffic mix 370, header compression 380, and silence suppression 390. In one embodiment, the service provider determines the content of the menu presented to the customer based on the standards and options supported in the tool used to calculate the effective compression ratio. The service provider then gathers the traffic information and determines the Effective Data Rate (EDR) and Effective Compression Ratio (ECR). The service provider then provides the EDR and ECR to the customer. The customer may use the data to determine the number of ports and/or interfaces needed for the services.

Figure 4:
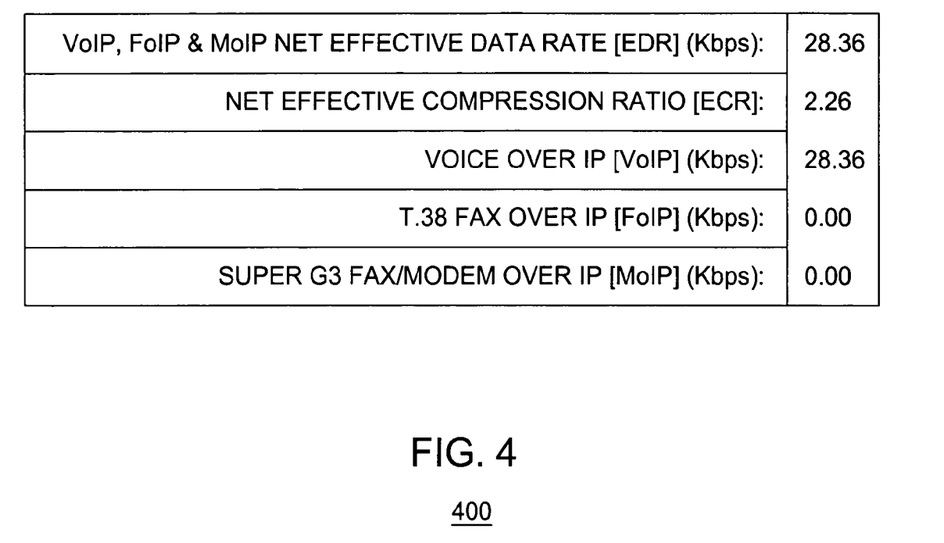
FIG. 4 illustrates an output that may be presented to the customer.

FIG. 4 illustrates an output 400 of the tool that may be presented to the customer. For example, the ECR is 2.26 and the EDR is 28.36. G.729A standard was used for encoding the voice traffic. One sample per packet of 20 ms was taken. The traffic consisted only speech without silence suppression. The VoIP overhead had no compression.

Figure 5:
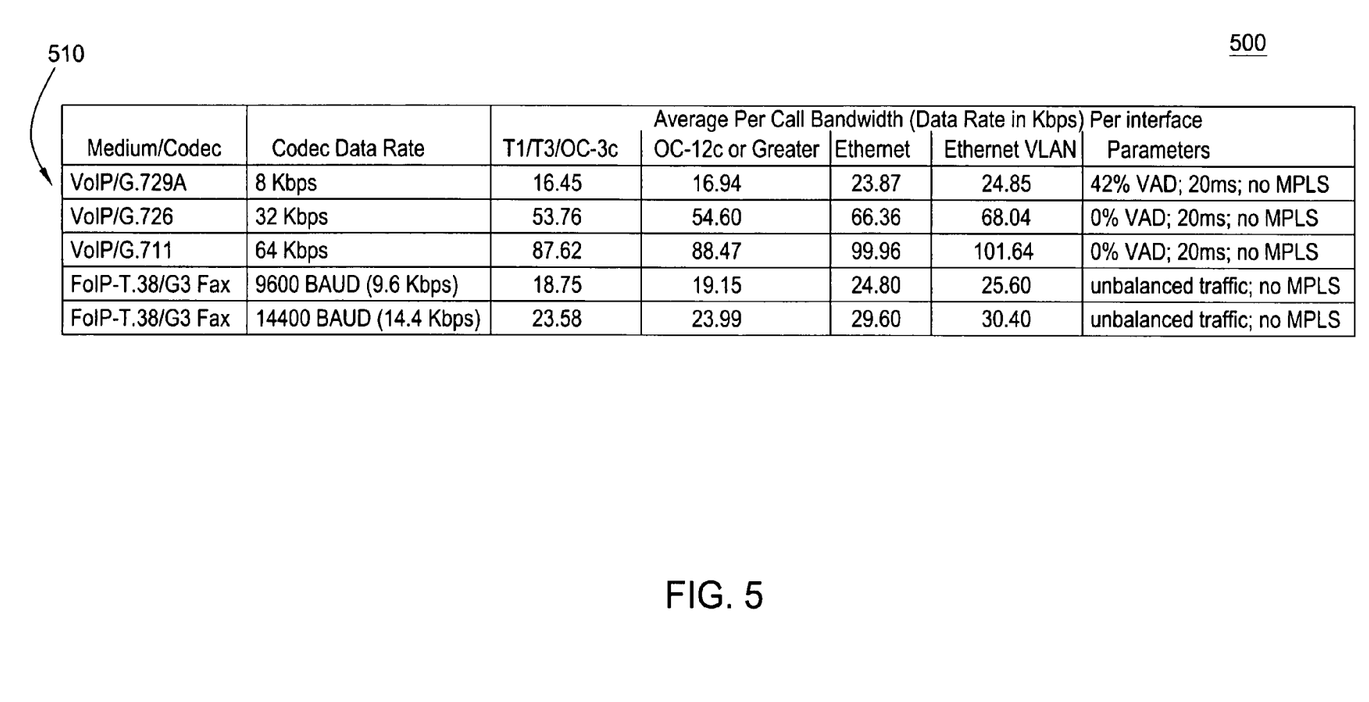
FIG. 5 illustrates the bandwidth consumption dependency on VoIP interfaces.

FIG. 5 illustrates the bandwidth consumption dependency 500 on VoIP interface. The overhead and the concatenation vary based on interface. For example, if the voice is encoded using the G.729A 8 Kbps standard as shown in 510, the bandwidth per call is 16.45 Kbps on a T1 interface but 23.87 Kbps on an Ethernet interface and so on.

Figure 6:
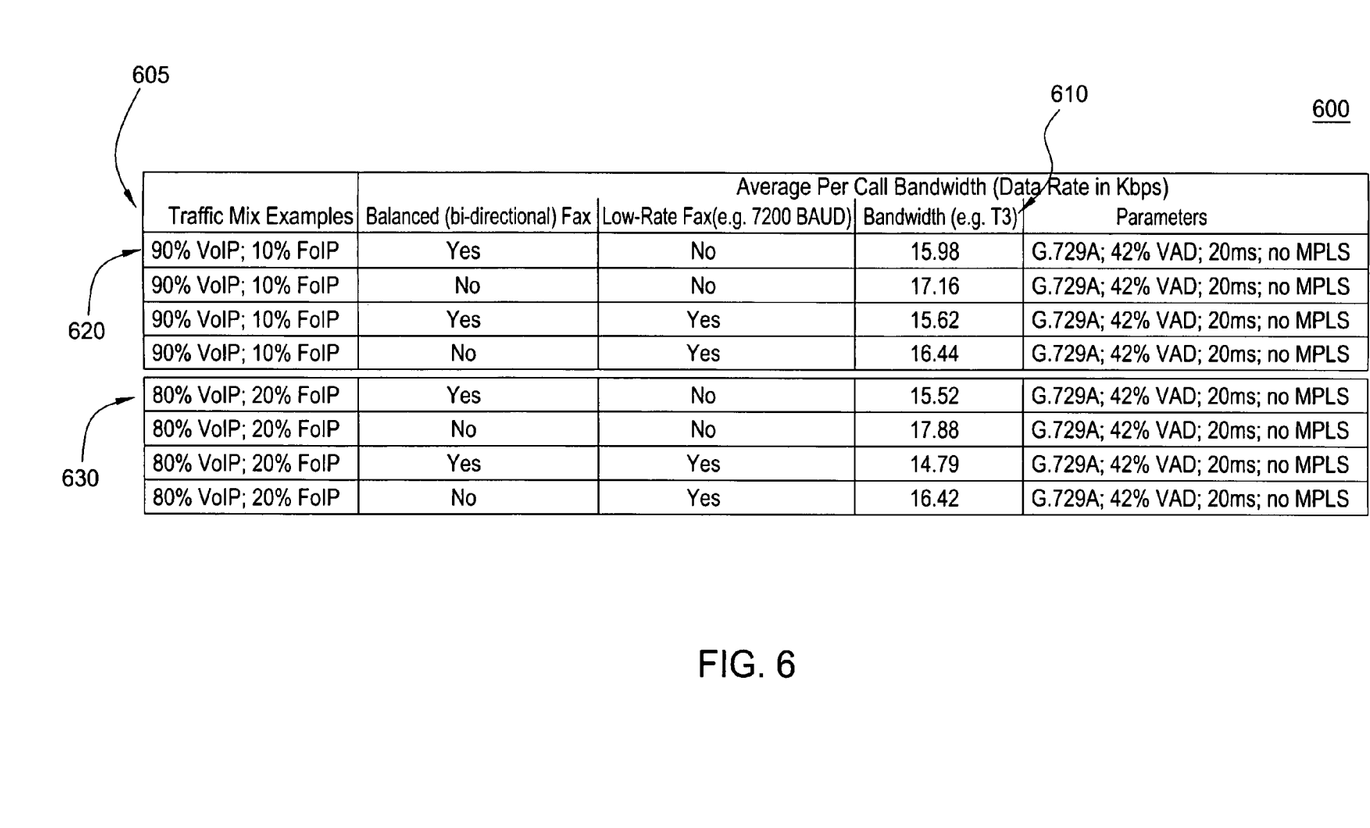
FIG. 6 illustrates the effect of different traffic mixes.

FIG. 6 illustrates a table 600 on the effect of different traffic mixes 605 on a combined VoIP and FoIP bandwidth 610. For example, the traffic mix of 90% VoIP and 10% FoIP shown in row 620 requires 15.98 Kbps while the traffic mix of 80% VoIP and 20% FoIP shown in row 630 requires 15.52 Kbps of bandwidth (with all other parameters kept the same) and so on.

In one embodiment, the service provider also determines the number of ports needed to support the services. For example, the service provider determines the required capacity (e.g., number of ports) for providing services on traditional networks using standard circuit switched Erlang methods. The service provider then divides the resulting number of ports for the traditional network by the ECR determined above for the IP network to derive the number of ports needed for providing services on the IP network.

For example, if the traffic required 1000 DS0s worth of capacity on a circuit switched network and it is to be carried using a VoIP network with each IP packet carrying a single 20 millisecond frame of G.729A encoded speech encapsulated in point to point protocol frames, the tool provides an effective compression ratio of 2.39. The 1000 DS0s take about 42 circuit switched T1s (Number of T1s=Number of DS0s/24). Therefore, the VoIP T1s are derived to be about 18.

Figure 7:
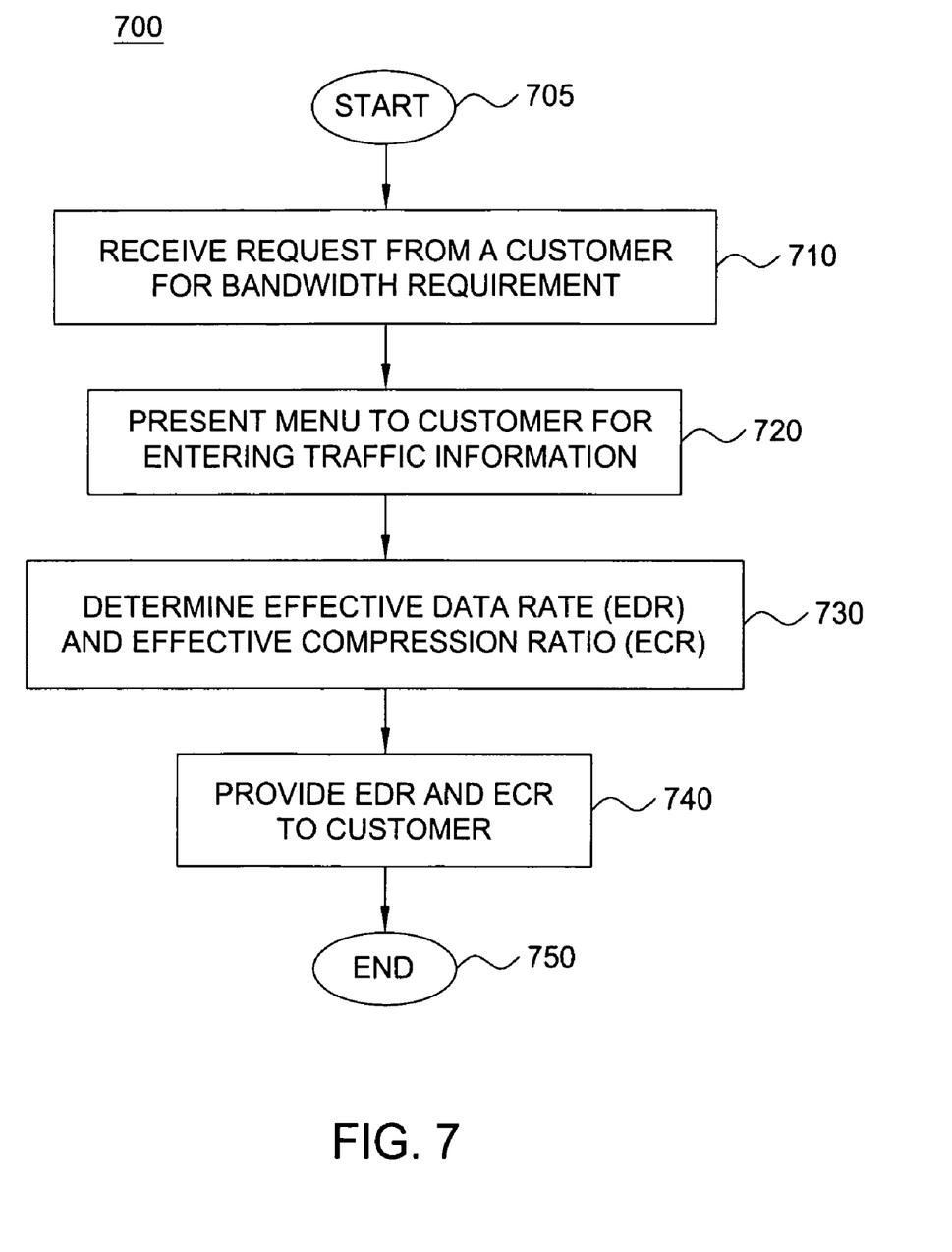
FIG. 7 illustrates a flowchart of the method for providing the bandwidth needed for services over the IP network.

FIG. 7 illustrates a flowchart of one embodiment of a method 700 for providing the bandwidth required for services provided over an IP network. The service provider creates a tool (e.g., an algorithm or a software application) that calculates the effective compression ratio and effective data rate of traffic on IP networks based on traffic information obtained from a customer and standards for coding, protocol overhead, sampling, etc.

Method 700 starts in step 705 and proceeds to step 710. In step 710, method 700 receives a request from a customer for determining a bandwidth requirement. For example, a customer sends a request to the service provider requesting for a combined bandwidth calculation for FoIP, VoIP and MoIP services.

In step 720, method 700 presents a menu, e.g., on a single display, to the customer for entering traffic information using the media server 115. For example, the menu can be accessed via a web site supported on an application server. The traffic information may include mixture of traffic (voice, fax, modem, etc.), layer 2 and layer 3 protocols used, coder/decoder types, data rate, number of samples per packet, length of sample packet, two-way versus one-way transmission of packets, various types of packets, usage of bandwidth optimization techniques such as silence suppression and data compression, etc.

In step 730, method 700 determines the Effective Data Rate (EDR) and Effective Compression Ratio (ECR) based on the entered traffic information. For example, the network service provider utilizes the application server 114 to determine the ECR and EDR based on the specific data received from the customer and the algorithm built based on knowledge of the various protocol standards and interfaces available for use.

In step 740, method 700 provides the EDR and ECR to the customer. The customer may use the ECR or EDR to determine the number of ports and/or interfaces needed for the service. For example, if the ECR is 2.0 and the number of ports on a circuit switched network required for the service is 20, then the number of ports for the IP network is then 10 (derived by dividing 20 by 2).

In one embodiment, the service provider utilizes the ECR or EDR to determine the number of ports needed to support the services and provides the port information to the customer. The customer may use either information to determine the cost and size of the network needed for obtaining services on the IP platform. Method 700 then ends in step 750.

Figure 8:
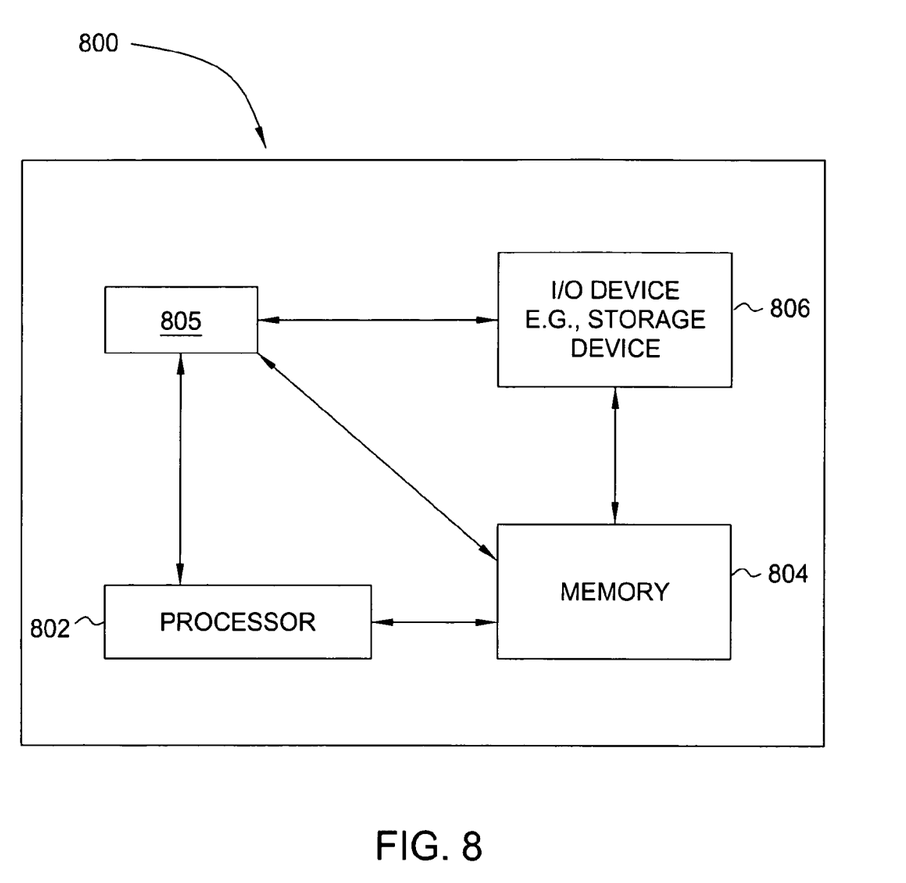
FIG. 8 illustrates a high-level block diagram of a general-purpose computer suitable for use in performing the functions described herein.

FIG. 8 depicts a high-level block diagram of a general-purpose computer suitable for use in performing the functions described herein. As depicted in FIG. 8, the system 800 comprises a processor element 802 (e.g., a CPU), a memory 804, e.g., random access memory (RAM) and/or read only memory (ROM), a module 805 for determining the bandwidth required for services provided on an IP network, and various input/output devices 806 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, alarm interfaces, power relays and the like)).

It should be noted that the present invention can be implemented in software and/or in a combination of software and hardware, e.g., using application specific integrated circuits (ASIC), a general-purpose computer or any other hardware equivalents. In one embodiment, the present module or process 805 for determining the bandwidth required for services provided on an IP network can be loaded into memory 804 and executed by processor 802 to implement the functions as discussed above. As such, the present method 805 for determining the bandwidth required for services provided on an IP network (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for determining a bandwidth for providing at least one service on a packet network, comprising:

receiving a request from a customer to determine the bandwidth for providing a service on the packet network before the service is provided on the packet network;

presenting a menu to the customer for entering traffic information; and determining, by a processor, an effective data rate and an effective compression ratio based on the traffic information, wherein the customer uses the effective compression ratio to determine a number of ports that are needed for the service to be provided on the packet network, wherein the number of ports is calculated by dividing a number of ports need on a traditional network by the effective compression ratio.

* * * * *